United States Patent [19]

Weaver

[11] 4,052,089
[45] Oct. 4, 1977

[54] SELF-ADJUSTING SEAL ASSEMBLY

[75] Inventor: Norman Dean Weaver, Pickerington, Ohio

[73] Assignee: Diamond Power Specialty Corporation, Lancaster, Ohio

[21] Appl. No.: 694,759

[22] Filed: June 10, 1976

[51] Int. Cl.² .............................................. F16L 59/02
[52] U.S. Cl. ..................................... 285/47; 285/189; 285/224; 403/187
[58] Field of Search .................. 285/46, 47, 187, 189, 285/197, 224, 319; 277/148; 403/187, 230, 233, 263

[56] References Cited

U.S. PATENT DOCUMENTS

| 645,224 | 3/1900 | Boehling | 277/148 X |
|---|---|---|---|
| 1,896,225 | 2/1933 | Dyer | 285/187 |
| 2,268,287 | 12/1941 | Kermode et al. | 277/148 X |
| 3,198,557 | 8/1965 | Portouw | 285/224 |
| 3,337,224 | 8/1967 | Eser, Jr. et al. | 277/148 |
| 3,567,232 | 3/1971 | Rickerson | 277/148 |

Primary Examiner—Werner H. Schroeder
Assistant Examiner—Conrad L. Berman
Attorney, Agent, or Firm—Vytas R. Matas; Joseph M. Maguire

[57] ABSTRACT

A self-adjusting seal assembly is formed to fit around a member extending from a structure which is thermally insulated with insulation panels but which leaves a gap around the insulated member. The self-adjusting seal assembly covers this gap and automatically compensates for any gap variation due to thermal expansion and contraction. The assembly has a first spring biased seal member located on the insulation panel to partially abut against the member and partially seal the gap around the member. A second seal member is spring biased to abut against the first seal member to thereby completely enclose the member and the gap around the member. As the structure member expands or contracts the spring loaded seal members move to retain their position abutting the member and maintain the integrity of the gap seal.

5 Claims, 2 Drawing Figures

SELF-ADJUSTING SEAL ASSEMBLY

BACKGROUND OF THE INVENTION

1. Field of the Invention

This invention relates generally to reflective insulation assemblies having members such as pipes extending therefrom and particularly to self-adjusting seals for such extending members.

2. Description of the Prior Art

The use of bright, or highly reflective sheets assembled into panels which provide thermal insulation for industrial equipment has been an established practice for a number of years. Ordinarily, aluminum or stainless steel sheets are used for this purpose. The high reflectivities that characterize these materials tend to obstruct the flow of radiant heat and provide an efficient, sturdy, light-weight, and long-lasting insulation.

In the commercial use of such insulation assemblies problems of fabrication and installation have been encountered. One of the commonly occurring problems has been that of sizing panels to provide a seal around pipes and other protrusions extending through the insulation panels. Very often it is discovered when the fabricated reflective insulation units are delivered that the workmen who erected the structure deviated from the engineering specifications and drawings in the actual dimensions of the finished structure. The fabricated reflective insulation panel thus does not properly fit on the actual structure in the field leaving gaps around the protrusions. This is especially the case in situations where the panel required a cut-out to allow a pipe to extend through the insulation panel.

Another problem with such construction is that a certain minimum gap must be provided around the pipe extending through the insulation panel to allow for thermal expansion and contraction of the pipe. It will be remembered that such pipes may be used to carry superheated steam and the expansion and contraction of the pipe is quite sizable. This gap then becomes a source of considerable convection heat loss from the insulating panels and detracts significantly from the thermal efficiency of the insulation system.

SUMMARY OF THE INVENTION

The present invention solves the forementioned problems associated with prior art insulation systems as well as other problems by providing a self-adjusting seal assembly which seals the gap around the member extending through the insulation panel and maintains the seal under any contraction and expansion of the extending member.

To accomplish this the self-adjusting seal assembly is formed to fit around the member which extends from the thermally insulated structure to thereby cover the gap around the member. The seal assembly is formed from a pair of spring-biased seal members. The first spring-biased seal member is located on the insulation panel to partially abut against the member and partially seal the gap around the member. The second seal member is spring-biased to abut against the first seal member to completely enclose the structure member and to completely seal the gap around the member. As the member expands or contracts the seal members move due to their spring loading to retain their position abutting the member and to retain the integrity of the gap seal.

From the foregoing it will thus be seen that one aspect of the present invention is to provide a self-adjusting seal assembly for sealing the gap around any members extending through the insulation panel system.

Another aspect of the present invention is to provide a self-adjusting seal assembly which adjusts itself to any expansion or contraction of the sealed member.

These and other aspects of the present invention will be better understood after reviewing the following description of the preferred embodiment and the accompanying drawings.

DESCRIPTION OF THE PREFERRED EMBODIMENT

Figure 1:
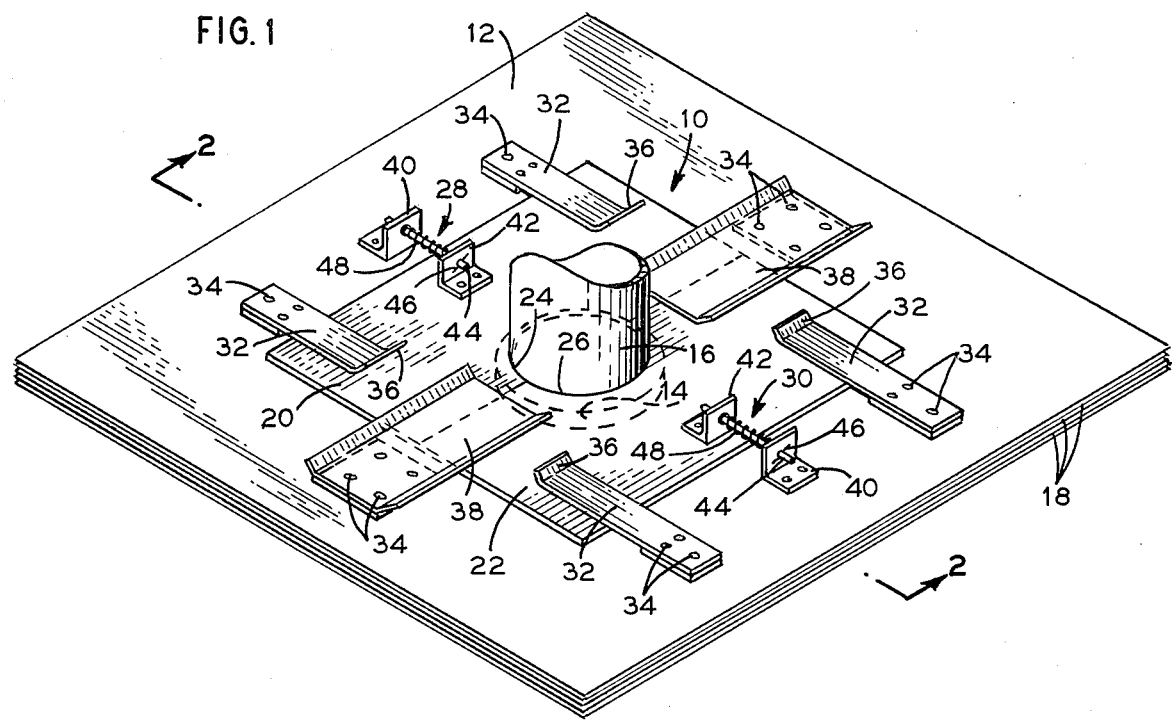
FIG. 1 depicts the self-adjusting seal assembly of the present invention.

Referring now to the drawings, it will be understood that the showings therein are intended to depict a preferred embodiment of the present invention and not to limit the invention thereto.

Figure 2:
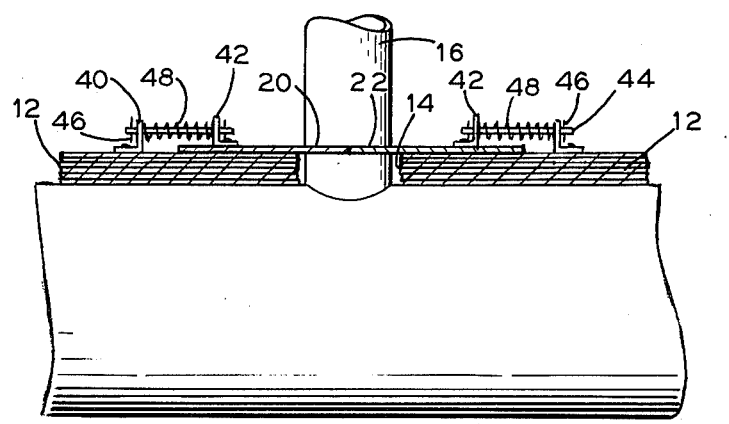
FIG. 2 is a cross-sectional side view of the assembly of FIG. 1 taken along line 2—2 of FIG. 1.

As may be best seen with reference to FIGS. 1 and 2 the self-adjusting seal assembly 10 is mounted to a reflective insulation panel 12 having an opening 14 formed therein through which a pipe 16 is extended leaving a significant gap around the pipe 16. This gap is purposely maintained to allow for thermal expansion and contraction of the pipe 16.

As is known, the reflective insulation panel 12 is formed to have a plurality of spaced stainless steel sheets 18 between which air is trapped. Thus the gap between the pipe 16 and the opening 14 would allow convective heat losses from these spaces which would impair the thermal efficiency of the reflective insulation panel 12 unless that gap is enclosed. Heat loss from the ends of the panel 12 is usually no problem since the panel 12 ends are either sealed or are made to overlappingly abut another panel (not shown).

The seal assembly 10 seals this gap between the pipe 16 and the opening 14 by providing a pair of seal members 20 and 22 which have respective cut-out areas 24 and 26 conforming to the shape of the pipe 16. Thus when the seal members 20 and 22 are abutting, they completely enclose the pipe 16 and seal the gap between the pipe 16 and the panel 12. Although the seal members 20 and 22 are shown to be abutting it will be understood that they could just as easily be made to overlap in the abutting area to further insure a seal between the abutment.

The seal members 20 and 22 are maintained in their abutting relationship by spring assemblies 28 and 30 which allow independent and two dimensional motion of the seal members 20 and 22 in the plane of the panel 12. This mobility of the seal members allows for shifting of the pipe 16 as well as for thermal expansion and contraction of the pipe 16. As the pipe 16 expands, the seal members 20 and 22 will move against the restoring force of the spring assemblies 28 and 30 to be forced apart to provide a larger opening for the pipe 16. Similarly as the pipe contracts, the spring assemblies 28 and 30 will force the seal members 20 and 22 closer together to decrease the opening for the pipe 16.

To limit the motion of the seal members 20 and 22 to the plane of the panel 12 a series of clip members 32 are provided. Each clip member 32 has one end retained to the panel 12 by pop rivets 34 with the opposite end having a guide edge 36 allowing the seal member 20 or 22 to be easily slid thereunder. To strengthen and to seal the abutting edges of the seal members 20 and 22 a pair of larger clip members 38 are also added. These clip members 38 have one end pop-riveted to the panel 12 by pop-rivets 34 with the other end extending over the abutting ends of the seal members 20 and 22. Thus in high pipe 16 expansion situations where a gap may occur in the abutting area of the seal members, the clip members 38 will seal most of the gap.

Each spring assembly 28 and 30 has a bracket 40 pop-riveted to the panel 12 and a bracket 42 pop-riveted to the seal member 20 or 22. A shaft 44 is loosely retained between the brackets 40 and 42 by cotter pins 46. A spring 48 is wound around the shaft 44 to be retained internally of the brackets 40 and 42. The spring 48 is mounted in a loaded condition to exert a spring force on the seal members 20 and 22 forcing them into an abutting position.

Although both the seal members 20 and 22 are shown to be spring loaded and movable it will be understood that in situations where thermal expansion is minimal one of the seal members 20 or 22 could be permanently affixed to the panel 12 and the remaining member would then provide sufficient adjustability.

Certain modifications and improvements will occur to those skilled in the art upon consideration of the foregoing specification. It will be understood that such modifications and improvements have been deleted herein for the sake of conciseness and readability but are clearly within the scope of the present invention.

What I claim is:

1. A seal assembly for structures having a member extending through thermal insulation panels which cover the structure while leaving a gap around the member comprising:

a thermal insulation panel adapted to receive said extending member so as to leave a gap between said member and said thermal insulation panel;

a first seal member located on the external face of said thermal insulation panel adapted to abut the extending member and partially enclose the gap between said member and said thermal insulation panel;

a second seal member slidably located on the external face of said thermal insulation panel to join with the first seal member to completely enclose the gap between the member and the thermal insulation panel;

biasing means for maintaining said second seal member against said first seal member to insure the sealing of the gap while allowing expansion and contraction of the member; and clip means for maintaining said first and second seal members in slidable contact with the external face of said insulation panel.

2. A self-adjusting seal assembly for preventing heat loss around a member extending out through a thermal insulation panel comprising:

a panel of thermal insulation adapted to receive said member extending through said panel so as to have a gap around said member to allow thermal expansion of said member;

a first seal member located on said panel;

a second seal member located on said panel to slide against said first seal member to thereby seal the gap between said member and said panel of thermal insulation; and means for retaining said second seal member against said first seal member while allowing for thermal expansion of said member, said retaining means including a first spring-loaded mechanism affixed to the external face of said panel for biasing said second seal member into engagement with said first seal member.

3. A self-adjusting assembly as set forth in claim 2 wherein said first seal member is slidably located on said panel and including a second spring loaded mechanism affixed to said panel for biasing said first seal member into engagement with said second seal member.

4. A self-adjusting assembly as set forth in claim 3 including clip means for retaining said first and second seal members on said panel.

5. A self-adjusting assembly as set forth in claim 4 wherein said clip means includes a pair of clips affixed to said panel to extend over the area of said first and second seal members wherein said first seal member slides against said second seal member.

* * * * *